(12) United States Patent
Wen et al.

(10) Patent No.: US 12,164,400 B2
(45) Date of Patent: Dec. 10, 2024

(54) TELEMETRY-BASED MODEL DRIVEN MANUFACTURING TEST METHODOLOGY

(71) Applicant: Cisco Technology, Inc., San Jose, CA (US)

(72) Inventors: ShiJie Wen, Sunnyvale, CA (US); Dao-I Tony Lin, Pleasanton, CA (US); Anthony Winston, Akron, OH (US); Jie Xue, Dublin, CA (US); James Edwin Turman, Round Rock, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 95 days.

(21) Appl. No.: 17/590,518

(22) Filed: Feb. 1, 2022

(65) Prior Publication Data

US 2023/0076130 A1    Mar. 9, 2023

Related U.S. Application Data

(60) Provisional application No. 63/241,143, filed on Sep. 7, 2021.

(51) Int. Cl.
| | | |
|---|---|---|
| G06F 11/20 | (2006.01) | |
| G06F 11/27 | (2006.01) | |
| G06F 11/34 | (2006.01) | |

(52) U.S. Cl.
CPC .......... G06F 11/27 (2013.01); G06F 11/3495 (2013.01)

(58) Field of Classification Search
CPC .......... G06F 11/27; G06F 11/34; G06F 11/26; G06F 11/3495; G06F 11/261
See application file for complete search history.

(56) References Cited

U.S. PATENT DOCUMENTS 6,941,287 B1 * 9/2005 Vaidyanathan ........ G06N 3/126
                                                              706/14
7,216,062 B1 * 5/2007 Vacar ................... G06F 11/008
                                                              702/185

(Continued)

FOREIGN PATENT DOCUMENTS

| TW | 201908747 A | 3/2019 |
| WO | 2020159539 A1 | 8/2020 |

OTHER PUBLICATIONS

Stoyan Stoyanov, et al., "Predictive Analytics Methodology for Smart Qualification Testing of Electronic Components," Springer, Journal of Intelligent Manufacturing, Dec. 24, 2018, 20 pages.

(Continued)

*Primary Examiner* — Kamini B Patel
(74) *Attorney, Agent, or Firm* — Edell, Shapiro & Finnan, LLC

(57) ABSTRACT

An approach is presented herein to use an in-situ algorithmic decision methodology during each stage of testing before 2C/4C to decide how long to test, how much margin should be used for each device under the test (DUT) to shorten or eliminate 2C/4C testing. Each DUT will be tested differently based on the risk level or the likelihood of failure at 2C/4C. To be able to achieve this, low-level hardware (HW) based sensors (on the printed circuit board assembly (PCBA), in power module, in silicon components, in silicon component complex, etc.) are used to collect telemetry data with a high frequency data acquisition rate during the testing. As testing is ongoing for each DUT, a margin distribution and algorithm modeling is performed in-situ.

20 Claims, 8 Drawing Sheets

(56) References Cited

U.S. PATENT DOCUMENTS

| | | | | |
|---|---|---|---|---|
| 10,124,893 | B1* | 11/2018 | Aalund | G08C 17/02 |
| 2007/0208538 | A1* | 9/2007 | Gross | G06F 11/24 |
| | | | | 702/182 |
| 2018/0082204 | A1* | 3/2018 | Iwamasa | G05B 17/02 |
| 2019/0377602 | A1* | 12/2019 | Mosca | G06Q 10/0635 |
| 2020/0110982 | A1* | 4/2020 | Gou | G06F 16/904 |
| 2020/0250057 | A1 | 8/2020 | Lim et al. | |
| 2020/0387148 | A1 | 12/2020 | Ghosh et al. | |
| 2021/0311844 | A1* | 10/2021 | Daniali | H04N 13/332 |
| 2023/0044564 | A1* | 2/2023 | Jezewski | G06F 40/30 |

OTHER PUBLICATIONS

Christian Streitwieser, et al., "Semiconductor Test: Real-time Adaptive test algorithm can safely reduce wafer testing lime and cost," Electronic Design, https://www.evaluationengineering.com/instrumentation/components/article/13013795/semiconductor-test-realtime-adaptive-test-algorithm-can-safely-reduce-wafer-testing-time-and-cost, May 19, 2016, 12 pages.

"IRC Overview," International Technology Roadmap for Semiconductors, 2013 Edition, 34 pages.

Jeff Anderson, et al., "On the Use of Usage Patterns from Telemetry Data for Test Case Prioritization," Information and Software Technology, May 22, 2019, 21 pages.

"Yang," Wikipedia, https://en.wikipedia.org/wiki/YANG, Feb. 1, 2022, 10 pages.

* cited by examiner

TELEMETRY-BASED MODEL DRIVEN MANUFACTURING TEST METHODOLOGY

CROSS REFERENCE TO RELATED APPLICATION

This application claims priority to U.S. Provisional Application No. 63/241,143, filed Sep. 7, 2021, entitled "Telemetry-based Model Driven Manufacturing Test Methodology," the entirety of which is incorporated herein by reference.

TECHNICAL FIELD

The present disclosure relates to manufacturing of electronic devices/products, such as networking devices.

BACKGROUND

In current electronic device product manufacturing processes, each product undergoes a thorough test process with multiple stages under various conditions, like particular combinations of temperatures, voltages, and the like. One test process, known as 2Corners/4Corners (2C/4C), involves the combinations of high and low temperatures with high and low voltages. The purpose of this testing is to screen out product defects, manufacturing process defects, and component/design marginality to ensure good hardware product quality in customer network operations. The goodness of the product quality is defined as products passing through these testing stages. Conventional testing outcomes are binary (i.e., pass or fail), and the passing units can be shipped to customers.

Increasing product complexity, data rate and bandwidth, new silicon and component technologies, have expanded coverage of tests, and the diagnosis of test failing products, resulting in higher manufacturing cost. Test times are thus getting longer, and more testing equipment is needed to manufacture products. Additionally, ramping new product to the desired volume also takes longer to achieve. Thus, tests such as the 2C/4C test can be a significant manufacturing bottleneck. There is a desire to minimize or eliminate such tests while still screening out bad quality products to avoid failures in the field.

DESCRIPTION OF EXAMPLE EMBODIMENTS

Overview

Figure 1:
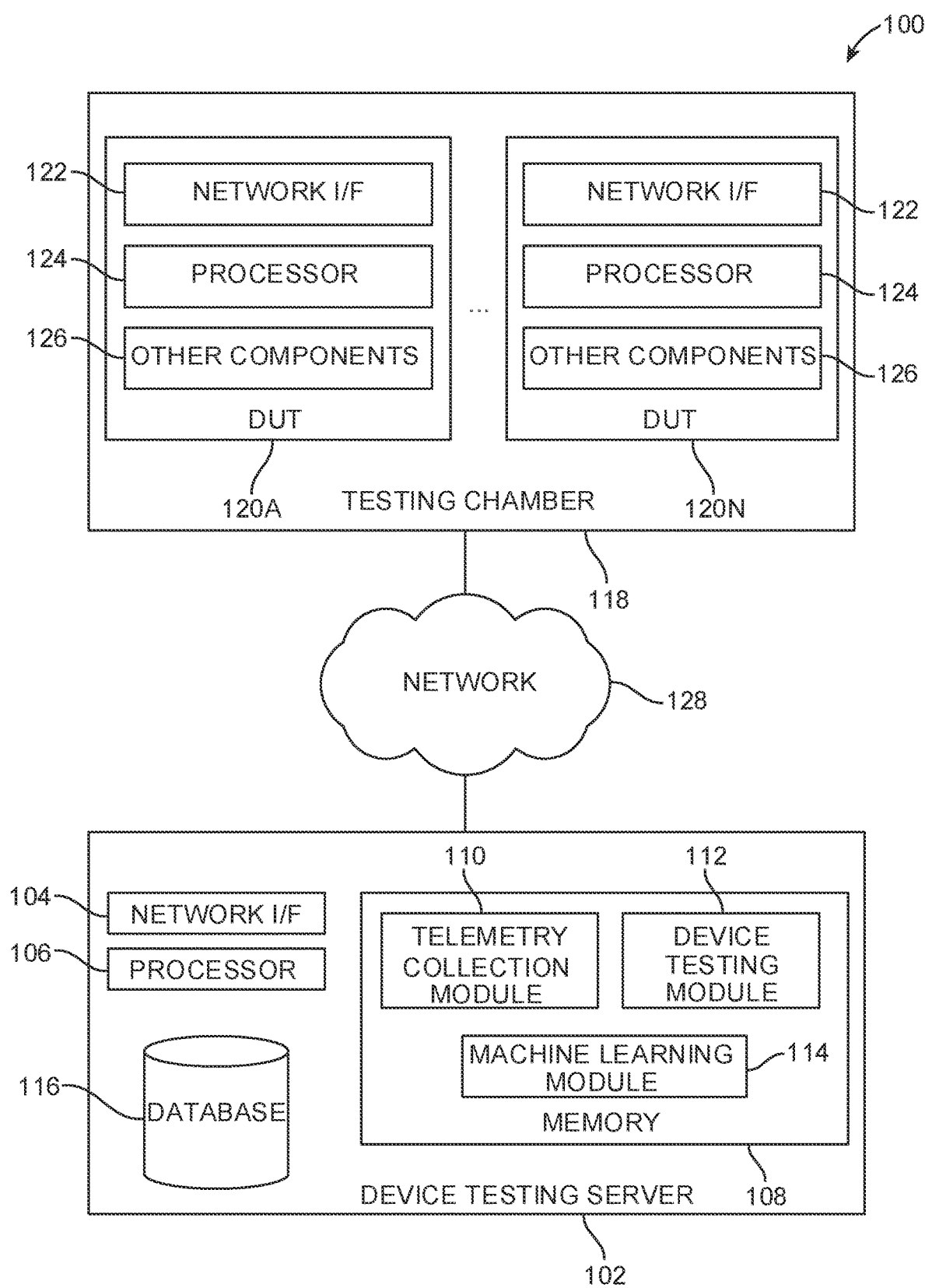
FIG. 1 is a block diagram of a testing environment, according to an example embodiment.

Briefly, an approach is presented herein to use an in-situ algorithmic decision methodology during each stage of testing before additional testing (e.g., 2C/4C testing) to decide how long to test, how much margin should be used for each device under the test (DUT) to shorten or eliminate the additional testing (e.g., 2C/4C testing). Each DUT will be tested differently based on the risk level or the likelihood of failure at a particular test. To be able to achieve this, low-level hardware (HW) based sensors (e.g., on the printed circuit board assembly (PCBA), in power modules, in silicon components, in silicon component complexes, etc.) are used to collect telemetry data with a high frequency data acquisition rate during the testing. As testing is ongoing for each DUT, a margin distribution and algorithm modeling is performed in-situ. A comparison is made to a particular product type existing model and then a real-time decision is made to reduce or eliminate the test length, test margin corners. Accordingly, the high frequency telemetry data acquisition and machine learning-based modeling converts the otherwise binary outcome (e.g., "pass" or "fail") into an analog outcome so that the adequate test decision can be made during the test run for each DUT.

EXAMPLE EMBODIMENTS

In product manufacturing, every product may undergo a thorough test process with multiple stages under various conditions, like temperature, voltage, etc. One testing methodology, 2Corners/4Corners testing, typically involves exposing electronic devices to combinations of high and low temperatures with high and low voltages. A typical test flow may involve tests such as (i) a diagnostic testing phase in which stress is not applied to the devices during operation of the devices, (ii) a diagnostic testing phase in which an electrical stress, a thermal stress, and/or other stresses, including combinations of stresses, are applied to the devices during operation of the device, and (iii) an operating system-level test. One example of each of these three phases may include a Pre2Corner (P2C) test, a 2Corner/4Corner (2C/4C) test, and a System and Traffic (SNT) (functional) test, respectively.

Each test may include defined test conditions with defined fixed test lengths for every product prior to approving units for shipping to customers. The purpose of these tests is to screen out product defects, manufacturing induced defects, and component/design marginality to ensure good hardware product quality for when the products are used in customer networks. The degree of a product's quality is defined as products passing through these testing stages. The test outcome is binary, pass or fail, and the passing units are shipped to customers.

With ever-increasing product complexity, data rates and bandwidth, as well as new silicon and component technologies, tests need to provide greater coverage, and as a result test time is increasing, and more testing equipment is needed. Due to the 2Corner/4Corner (2C/4C) test being by far the highest cost and a manufacturing bottleneck, there is a need and significant financial benefit to minimize or eliminate this step while still testing and screening out poor-quality products to avoid field failure in customer networks.

One testing approach, the Pre2Corner (P2C) test (e.g., a diagnostic test in which stress is not applied to the devices), has generally been implemented to improve yields at a subsequent test (e.g., a 2C/4C test, in which an electrical stress, a thermal stress, and/or other stresses are applied to devices). The P2C test often runs the same suite of tests executed in 2C/4C, but the tests are run at ambient room temperature and often outside of the environmental chamber (which can subject devices to extreme ranges of temperatures, pressures, etc.). One goal of the P2C test is typically to find major faults before committing to the longer test times in the environmental chamber (2C/4C). The cost of finding a failure in 2C/4C is relatively high because multiple products are often tested in a given test run in the environmental chamber. Thus, if one product fails at 2C/4C, it will likely sit there until the rest of the products have completed testing, thereby using up valuable test capacity. Accordingly, pass/fail criteria for P2C tests are defined with the rationale of improving 2C/4C test pass yields. Specifically, it is desirable to attain a high yield value at the P2C testing phase for which it is more cost-effective to catch the failures than at a 2C/4C testing phase.

More rigorous tests, such as 2C/4C testing, are a long-standing staple in the industry. As such, 2C/4C and similar tests are included for characterizing all boards of every product and ensuring the quality of products delivered to our customers. One goal of 2C/4C testing is to ensure proper product operation in the customer environment by manipulating complementary meta-oxide semiconductor (CMOS) process logic edges by varying component supply voltage and ambient temperature. A typical 2C/4C testing deployment utilizes a (i) high-temperature, low-voltage, (ii) high-temperature, high-voltage, (iii) low-temperature, high-voltage, and (iv) low-temperature, low-voltage set of test "corner" cases. These test corner cases drive the product's CMOS-process components into slow and fast edge rates, respectively. Accordingly, the premise behind 2C/4C testing is that if the product performs as expected in this margined environment, it will continue to perform in a (typically) less harsh customer environment over its life. However, 2C/4C chambers are expensive, and their use should be minimized.

Engineering Design Verification Testing (EDVT) results are an excellent source to understand if different corners represent a better use of available production test time and infrastructure. Early test deployment can also be used to test against wider voltage or temperature variations or combinations to identify the highest value margined states further to run in production. Many products have additional tests stations/areas before P2C and/or 2C/4C testing. The test stations/areas provide further fault isolation to improve the test yield at upstream testing.

The supply chain production test strategy is designed to drive efficient testing with a balance of cost, delivery, and quality metrics. Better quality by design will push more testing to suppliers over time and will require robust design margin demonstration during the development cycle. Understanding and leveraging EDVT results into a product's production test strategy to guide test case creation, for example, can enable supply chain by improving cost effectiveness and increasing the speed of delivery metrics.

Presented herein are techniques for testing products in volume manufacturing with streaming parametric telemetry data and predictive analytics. The use of streaming product parametric sensor data via telemetry and predictive analytics enables supply chains to ship high-quality products to customers, and eliminates the need to perform testing at temperature and voltage corners. This approach significantly decreases the investment of expensive test equipment and chambers, and decreases product test time substantially.

Accordingly, present embodiments improve the technical field of design and testing of electronic devices by greatly reducing the cost and time requirements for testing products to ensure that the products are fit for consumer usage.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a testing environment 100, according to an example embodiment. As depicted, testing environment 100 includes a device testing server 102, a testing chamber 118 with one or more devices under test (DUTs) 120A-120N, and a network 128. It is to be understood that the functional division among components of testing environment 100 have been chosen for purposes of explaining various embodiments and is not to be construed as a limiting example. The device testing server 102 may, in some embodiments, be more directly connected to the testing chamber 118 rather than a connection via network 128.

Figure 8:
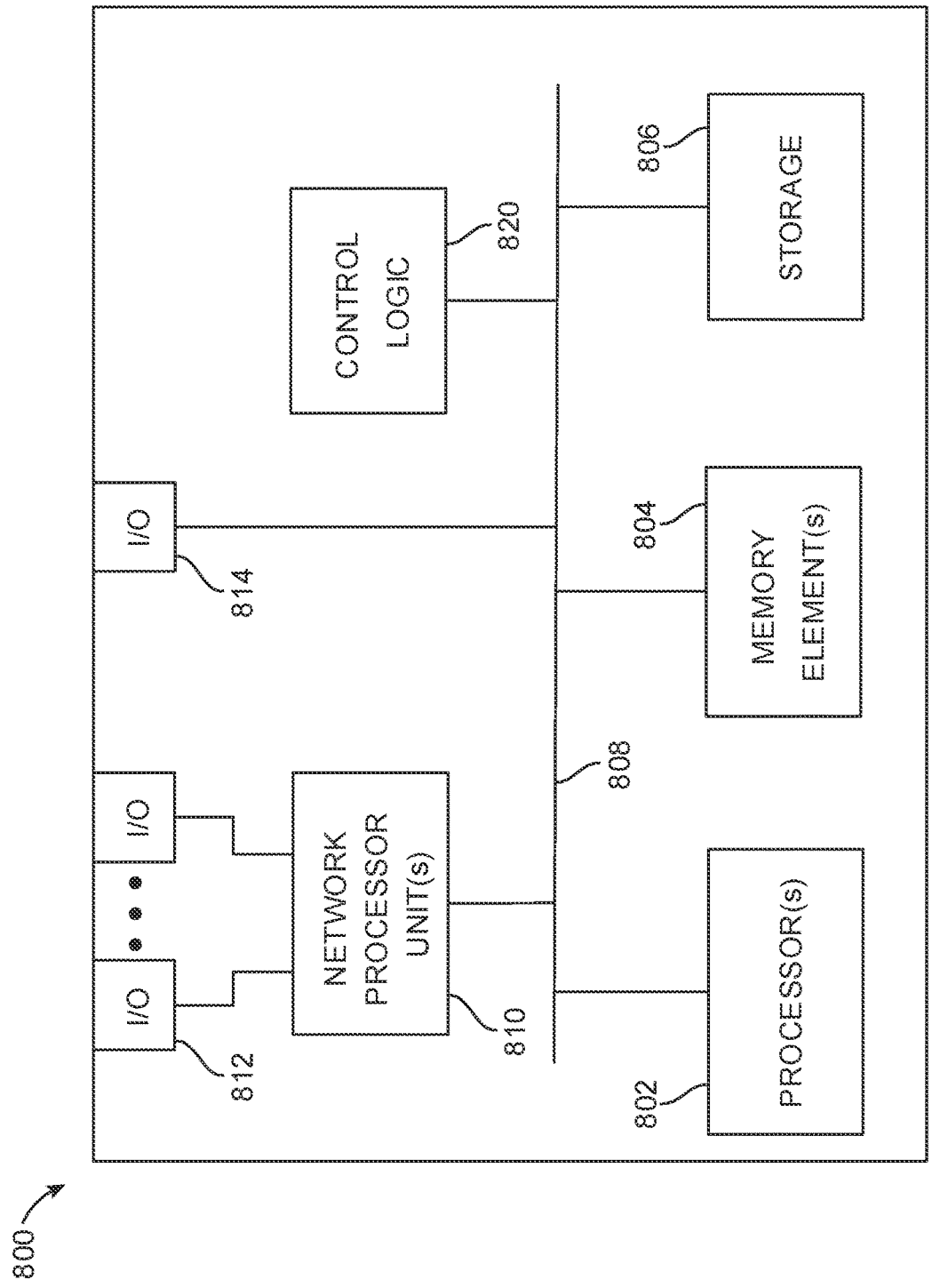
FIG. 8 is a block diagram of a device that may be configured to perform the machine-learning and testing-related computations of the testing process presented herein.

Device testing server 102 includes a network interface (I/F) 104, at least one processor 106, memory 108, and a database 116. Memory 108 stores software instructions for a telemetry collection module 110, a device testing module 112, and a machine learning module 114. Device testing server 102 may include a rack-mounted server, or any other programmable electronic device capable of executing computer readable program instructions. Network interface 104 enables components of device testing server 102 to send and receive data over a network, such as network 128. In general, device testing server 102 collects telemetry data and analyzes telemetry data using one or more machine learning models to determine whether devices can be included or excluded from additional testing. Device testing server 102 may include internal and external hardware components, as depicted and described in further detail with respect to FIG. 8.

Telemetry collection module 110, device testing module 112, and machine learning module 114 may include one or more modules or units to perform various functions of the embodiments described below. Telemetry collection module 110, device testing module 112, and machine learning module 114 may be implemented by any combination of any quantity of software and/or hardware modules or units, and may reside within memory 108 of device testing server 102 for execution by a processor, such as processor 106.

Telemetry collection module 110 may collect, pre-process, and/or organize telemetry data obtained from devices being tested (e.g., DUTs 120A-120N). The telemetry data may include any data that is collected, streamed from, or otherwise obtained from network-accessible devices, such as DUTs 120A-120N or other devices. Telemetry data may include data that indicates a current state or functioning of devices, including software and/or hardware states. In some embodiments, the telemetry data may include data obtained from sensors of devices, such as voltage data, temperature data, pressure data, and the like. Additionally or alternatively, telemetry data may include data that indicates or relates to resource utilization of devices, such as processor utilization, memory utilization, bandwidth utilization, storage utilization, and the like. In some embodiments, telemetry data may indicate any errors encountered by devices, and as such, may include error log data, uptime data, and other collectible data relating to errors or other disruptions in functionality.

The telemetry data collected by telemetry collection module 110 may include any data that is collected and streamed in real-time or near real-time from devices. In particular, the telemetry data can include model-driven telemetry data, which is an approach to network monitoring in which data is streamed from network devices continuously using a push model, thus providing real-time or near real-time access to operational statistics of network-accessible devices.

In some embodiments, the telemetry data adheres to a particular data model, such as the Yet Another Next Generation (YANG) data model. Accordingly, telemetry collection module 110 may subscribe to particular YANG paths of interest in each device from which telemetry data is collected, thereby receiving time-series data in real-time or near real-time according to the cadence at which the telemetry data is set.

Telemetry collection module 110 may store the telemetry data according to a time-series schema. In some embodiments, telemetry collection module 110 stores the data in database 116. Telemetry collection module 110 may organize the data by device so that time-series data can be analyzed or otherwise processed on a per-device level. In some embodiments, telemetry collection module 110 may perform pre-processing on collected data, such as discarding known bad data, converting data from one format to another, generating additional data using statistical analysis (e.g., generating moving averages of particular values over specified timespans), and the like.

In some embodiments, telemetry gathered by telemetry collection module 110 may include data obtained from messages transmitted during run time of devices. Run time data may be obtained during manufacturer testing, in a customer network, during an EDVT stage, and the like. Telemetry can be transmitted either via a pull (e.g., request) method, in which another device requests the telemetry data, or via a push method in which a device under test outputs the data in a predetermined fashion (e.g., according to a schedule or streaming the data as the data becomes available). Present embodiments may use various data models, including YANG, as well as Command Line Interface (CLI), Data Management Engine (DME), Telemetry Data Log (TDL), Simple Network Management Protocol (SNMP), and the like.

Device testing module 112 may cause devices to be tested in accordance with present embodiments and/or may determine whether devices that are tested (e.g., DUTs 120A-120N) have passed or failed their tests. In some embodiments, device testing module 112 may transmit instructions to testing chamber 118 to initiate particular testing sequences, such as P2C, 2C/4C, and the like. The instructions transmitted by device testing module 112 may include specific environmental features to apply to devices inside of testing chamber 118, such as particular temperatures, voltages, pressures, and/or combinations thereof. In some embodiments, device testing module 112 may transmit instructions that specify time durations at which devices should be subject to particular temperatures, voltages, pressures, and the like.

In some embodiments, device testing module 112 determines which devices should be included in a particular test. In particular, device testing module 112 may specify particular types of devices, counts of devices by type, and/or specific individual devices (e.g., by unique identifier) that should be included in a particular test. The testing conditions to which devices are subjected in a test can be predetermined or determined based on output of machine learning module 114, which can indicate whether certain devices should be excluded from additional testing and/or can indicate particular test conditions (e.g., temperature values, voltage values), for one or more of the devices during a test. When a test is initiated, device testing module 112 may transmit instructions to telemetry collection module 110 to begin collecting telemetry.

Additionally or alternatively, device testing module 112 may determine, either during or at an end of a test, a pass or fail criterion for one or more of the devices included in a particular test. Based on telemetry data collected by telemetry collection module 110, device testing module 112 may determine, on a device-by-device basis or on a device model-basis, whether each device or model of device has passed or failed a particular test by comparing the telemetry data to pass or fail threshold values. Telemetry collection module 110 may perform additional processing of telemetry data, such as averaging values, counting instances of values that exceed thresholds values, and the like, in order to determine whether devices pass or fail a test. For example, a device may fail a test if the device encounters an error at a particular temperature and voltage combination, if the device encounters an error a particular number of times at a particular temperature and voltage combination, or if the device encounters any error at all during testing, etc.

Machine learning module 114 may train and/or apply one or more machine learning models in accordance with present embodiments. In some embodiments, machine learning module 114 includes a predictive model that has inputs of telemetry data collected from devices being tested (e.g., DUTs 120A-120N) and outputs, for each device, a probability that the device will pass or fail a current or subsequent test. The predictive model may be trained using training data that includes examples of telemetry data collected from devices that are labeled with respect to whether each device passed or failed a specified test (e.g., a current test or a future test). Accordingly, based on the examples provided in the training data, machine learning module 114 can be trained to output a value that estimates whether a particular device, currently being tested, will pass or fail a particular test. The machine learning model(s) employed to analyze devices are depicted and described in further detail with respect to FIGS. 2 and 7.

In some embodiments, the values output by machine learning module 114 may be used to include or exclude devices from additional testing. In particular, the likelihood that a device may pass (or fail) a particular test can be compared to a threshold value to determine whether to include or exclude the device from further testing. For example, a threshold value of 90% may be provided, and any device that is more than 90% likely to pass a particular test may be omitted from that test.

Additionally or alternatively, the machine learning model can be applied to a currently-tested device to transform a binary (e.g., pass or fail) output into a percentage output. Thus, by training a predictive model using labels that indicate whether devices eventually fail some test, or even fail after being shipped to consumers, machine learning module 114 can estimate a percentage likelihood that a particular device has passed a current test.

The output of machine learning module 114 can be used to make adjustments to current or future tests. In particular, the output values of machine learning module 114 can be provided to device testing module 112 to determine whether certain values, such as temperature values, voltage values, pressure values, etc., should be raised or lowered in a current or subsequent test. Additionally or alternatively, the durations of tests and/or sequences within tests may be modified based on the output values of machine learning module 114. Accordingly, the output values of machine learning module 114 can be used to make current or subsequent tests more or less rigorous in order to achieve desired testing goals.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store data including telemetry data, training data for machine learning models, registries of devices and associated pass or fail criteria for tests, testing instructions, and the like.

Testing chamber 118 may include any structure in which the environmental or other parameters of tested devices (e.g., DUTs 120A-120N) can be controlled. In various embodiments, testing chamber 118 may include an insulated container, hyperbaric chamber, hermetically-sealed chamber, and the like. Testing chamber 118 may include an interface for each device being tested so that electrical power and/or instructions can be provided to the devices. Testing chamber 118 may support communication between tested devices and a network, such as network 128. In various embodiments, testing chamber 118 may enable internal and/or external parameters of devices to be modified to expose devices to various parameters, including a temperature parameter, a voltage parameter, a pressure parameter, an electric current parameter, a capacitance parameter, a gyroscopic parameter, a microelectromechanical system (MEMS) parameter, a stress/strain parameter, a traffic rate parameter, a packet drop rate parameter, and an ambient environmental condition (e.g., temperature, humidity, etc.) parameter. Testing chamber 118 may include conventional or other components to achieve modification of desired parameters, including heating elements, air conditioning units, vacuum pumps, compressors, voltage regulators, mechanical agitators, hydraulics, and the like.

Devices under test (DUTs) 120A-120N each include a network interface (I/F) 122, at least one processor 124, and other components 126. Each DUT 120A-120N may include a laptop computer, a tablet computer, a netbook computer, a personal computer (PC), a desktop computer, a personal digital assistant (PDA), a smart phone, a video conferencing endpoint device, a router, a switch, a rack-mounted server, or any other programmable electronic device capable of executing computer readable program instructions. Network interface 104 enables each DUT 120A-120N to send and receive data over a network, such as network 128. In general, DUTs 120A-120N are provided to testing chamber 118 and subjected to a variety of hardware tests, software tests, and internal and external parameters in order to evaluate performance of DUTs 120A-120N. Each DUT 120A-120N may include internal and external hardware components, as depicted and described in further detail with respect to FIG. 8. The other components 126 may include any conventional or other components that are included in computing or networking devices, including displays, microphones, speakers, cameras, memory, non-volatile storage, MEMS components, and the like.

Network 128 may include a local area network (LAN), a wide area network (WAN) such as the Internet, or a combination of the two, and includes wired, wireless, or fiber optic connections. In general, network 128 can be any combination of connections and protocols known in the art that will support communications between device testing server 102 and/or DUTs 120A-120N via their respective network interfaces in accordance with the described embodiments.

Figure 2:
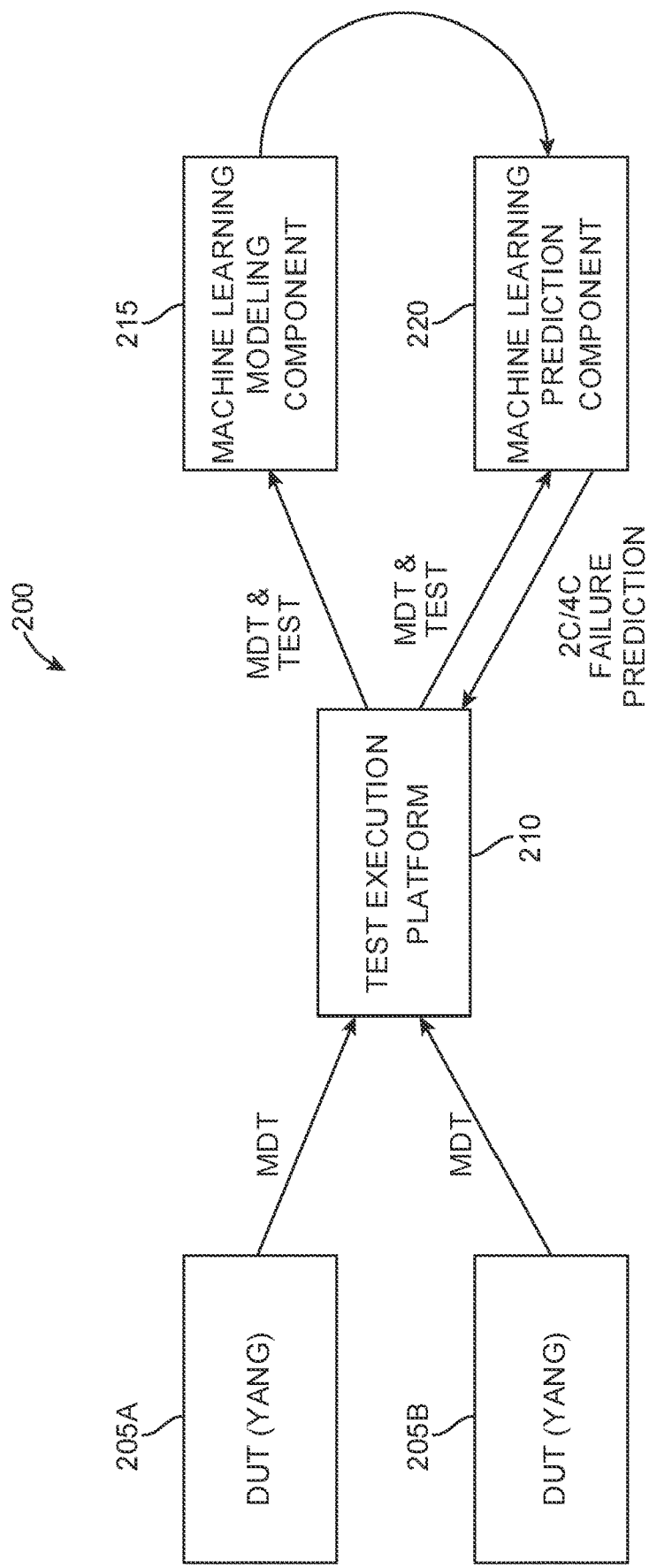
FIG. 2 is a block diagram of a platform that can support a testing process presented herein, according to an example embodiment.

Reference is now made to FIG. 2. FIG. 2 is a block diagram of a platform 200 that can support a testing process presented herein, according to an example embodiment. As depicted, platform 200 includes DUTs 205A and 205B, a test execution platform 210, a machine learning modeling component 215, and a machine learning prediction component 220. In some embodiments, DUTs 205A and 205B may correspond to any of DUTs 120A-120N, and/or test execution platform 210 may correspond to device testing module 112, both depicted and described with reference to testing environment 100 of FIG. 1. Similarly, machine learning modeling component 215 and/or machine learning prediction component 220 may correspond to, or may be subcomponents of, machine learning module 114, also depicted and described with reference to testing environment 100 of FIG. 1.

In manufacturing production processes, telemetry data is streamed from the DUT (e.g., DUT 205A and/or DUT 205B) controlled by the manufacturing test platform (e.g., test execution platform 210). Product parametric telemetry data includes data based on internal component parameters such as temperature, current, voltage, CPU utilization, etc., and external parameters such as traffic rate, packet drops, and ambient environmental conditions (e.g., temperature, pressure, humidity, etc.). There are several methods of streaming the telemetry data from the DUT (e.g., DUT 205A and/or DUT 205B). As the product telemetry data is streamed from the DUT, the telemetry data may be processed and formatted to allow the real-time predictive analysis of the data against the pre-engineered machine-learning model (e.g., machine learning prediction component 220). The collection of streamed parametric data from each specific DUT test station/area before the 2C/4C test station may allow for constructing a unique and highly accurate machine learning (ML) model particular for each product type or category of product (e.g., computing device (laptop, smartphone, etc.), network device (e.g., router, switch, model, etc.), etc.). The optimized ML model possess the functionality using multiple data science algorithms to identify if a DUT conforms to the ML model or is an outlier against the non-anomalous clustering of the parametric telemetry data.

This process model-driven telemetry (MDT) may provide advantages when predicting product failures on the production line at Electronics Manufacturing Services (EMS) partners. MDT may enable streaming of DUT parametric sensor telemetry data in real-time during test of each DUT. The DUT's parametric telemetry data can be streamed to real-time machine-learning (ML) and predictive model engines (e.g., machine learning modeling component 215 and/or machine learning prediction component 220). Thus, it is possible to characterize each DUT's functionality concisely and to return predictive analytics (e.g., pass/fail outcomes) to the production tester. These outcomes can inform the production tester which of the DUTs failed or passed the predictive analysis, and may specify each DUT by serial number or other unique identifier. Processing analytics in this way may enable the characterization of a product in as little as ten to fifteen minutes, a great reduction in the hours required by conventional manufacturing techniques. Outlier detection decision-making of the predictive analytics can determined by supervised and/or unsupervised ML modeling. Modeling in this way may enable each of the sensor data and values, serial number, etc., of each DUT to be labeled in order to identify clusters of devices that pass or fail together. Typically outliers are found to be in one cluster, resulting in the ability to diagnose components that require repair, redesign, or replacement based on the associated sensor(s) that have nonstandard readings. As a result, analytics facilitates expediting diagnosis and/or repair of tested products.

The end-to-end model-driven MDT may begin at Engineering Design Verification Testing (EDVT), a phase at which the predictive model for all products parturition initiates. The collection of product parametric telemetry data and model building of product accuracy increases as product parametric telemetry data is added from each test station/area upstream from P2C. Upstream product parametric telemetry data (EDVT, PCBST, and others) combined with P2C telemetry data may provide a superior dataset for machine learning training and prediction capability.

Methods to create aggregate and stream product parametric telemetry data from all products can be used to provide additional value in conjunction with predictive capabilities that are not possible via conventional approaches. One such is the creation of real-time parametric statistical process control with a programmable alarm setting. The alarm setting can alert a tester as to whether particular devices, or a threshold number of devices, are failing a particular test. This functionality is also available end-to-end in the manufacturing of products.

Two methods are developed to stream parametric telemetry data from products in manufacturing. In a first method, YANG paths that exist in a device operating system (e.g., Internetwork Operating System (IOS)) are used. As there are many YANG paths within an operating system, only the YANG paths that contain the sensor, parametric, or other parameters that are relevant to real-time predictive analytics are selected. Accordingly, test execution platform 210 may subscribe to the YANG paths of interest in the configuration of each DUT prior to or during testing. During the composition of YANG paths, the cadence at which the parametric telemetry data is set; in most cases, this setting may be every thirty seconds. The telemetry data is streamed to a time-series database (e.g., database 116 of testing environment 100), where the telemetry data is available to be obtained for real-time predictive analysis.

A second method uses Command Line Interface (CLI) to execute commands to obtain the parametric sensor data and construct the data available for streaming as parametric telemetry data. This second method offers the ability to collect parametric telemetry data before certain tests (e.g., the SNT test, a type of operating system-level test), thus providing the ability to create a more accurate machine learning model at SNT with substantial outcomes in predicting DUTs that would pass or fail a 2C/4C test. Thus, the number of DUTs that require testing at the 2C/4C test phase can be reduced. In one embodiment, any DUTs predicted to pass may be omitted from testing, and any DUTs predicted to fail are included in testing. As previously mentioned, environmental chambers used in certain tests, such as 2C/4C testing, are very expensive, and so, the ability to reduce the number of DUTs that are tested reduces the need for such expensive chambers, thereby reducing test time, increasing efficiency, and increasing the overall speed of the manufacturing process.

Once optimization of the predictive machine learning model is complete, products may be tested against the model to characterize the product on a scale of ten to twenty minutes instead of the hours required by conventional production techniques. The data collected can be checked against an already-trained model for the same platform or can be used to build a new model if a trained model does not exist already. If the new incoming data conforms to the model and is well within the normal population cluster, the product test can be halted, thus reducing its test duration.

Figure 3:
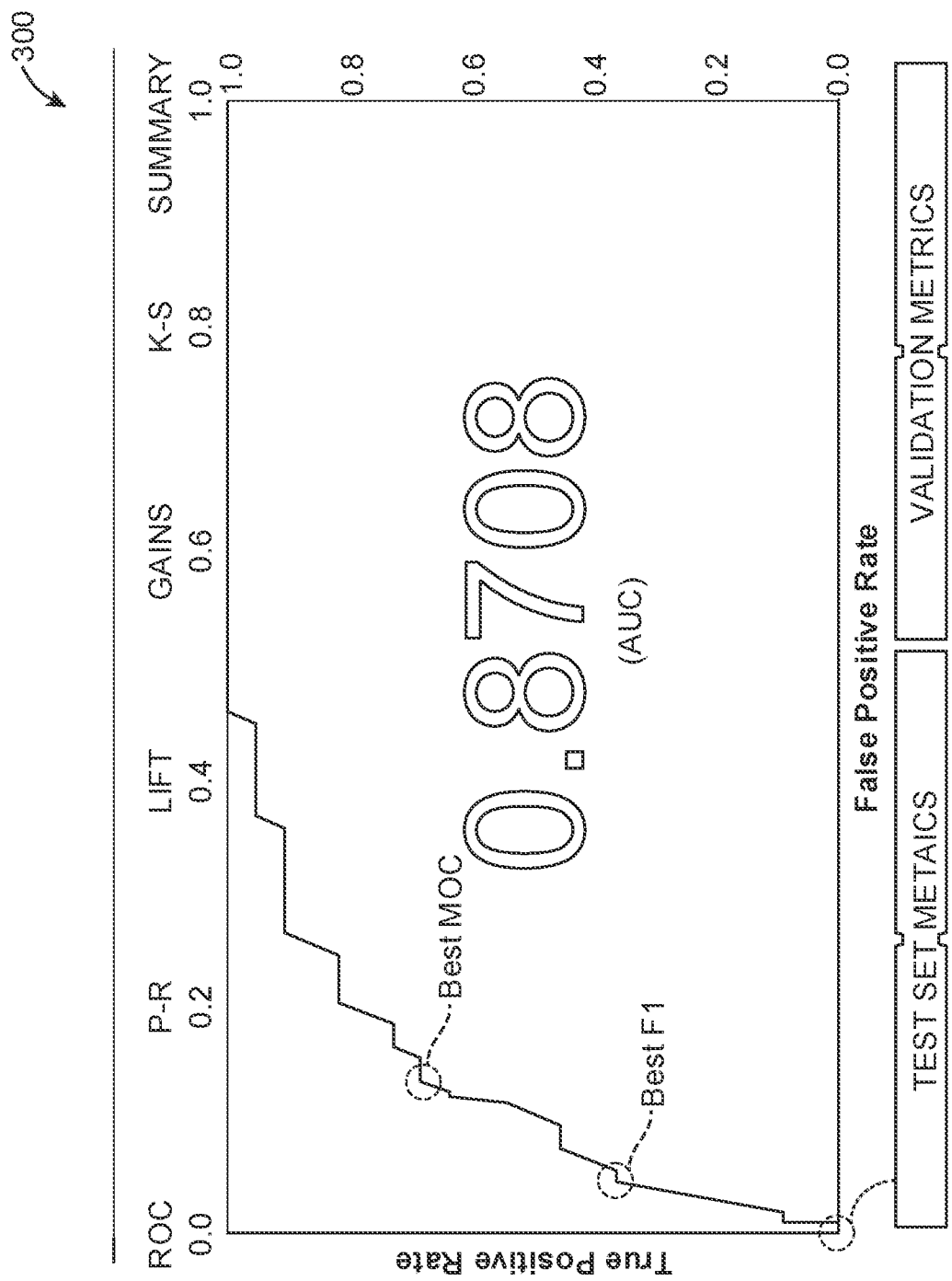
FIG. 3 is a diagram illustrating improved results that can be achieved with the testing process, according to an example embodiment.

Reference is now made to FIG. 3. FIG. 3 is a diagram 300 illustrating improved results that can be achieved with the testing process, according to an example embodiment.

In order to obtain the results of diagram 300, a supervised machine learning (ML) approach was adapted to help differentiate healthy and marginal units. A binary classifier was built, and this classifier allows a test platform to skip 2C/4C test for the healthy (low risk of failure) units and only perform 2C/4C test on the marginal DUT units. In addition to the telemetry data described above, this supervised ML model makes use of various test status from the previous test steps before 2C/4C test, specifically we use the test status from P2C test and SNT test. In the case of any test failure in those tests, all the component failure analysis reasons, PCB locations, and frequency counts were included in the model building process.

Various state-of-the-art ML algorithms may be used, including gradient boosting machine learning, distributed random forest and deep learning. An approximately 70% area under curve (AUC) for the Receiver Operating Characteristics (ROC) plot was achieved (a higher AUC indicates that a model is better at distinguishing between the positive and negative classes). In some embodiments, more complex machine learning algorithms may be employed, such as stacked ensembling of multiple ML models. Advanced feature engineering may be employed by creating new features based on the existing features. For instance, a model may be provided by performing a dimension reduction that reduces the number of dimensions from a large number to as little as three major principal dimensions, and uses these three additional attributes as new features. In one embodiment, new features are generated using unsupervised learning (e.g., k-means) to automatically create K clusters and use the distance to each of these K clusters as new features. From combining advanced feature engineering and stack ensemble algorithms, the ROC AUC may be increased from 70% to over 87%, as shown in FIG. 3.

With the use of ROC curves, present embodiments can determine an optimal trade-off point between test time saving and a 2C/4C escape rate. In a manufacturing test platform, the 2C/4C machine learning model may score every unit prior to 2C/4C testing, and, if the model gives a score of high potential for 2C/4C failure, then the device may be included in the 2C/4C test chamber. Accordingly, present embodiments provide the ability to save 53% of total 2C/4C testing time while maintaining a 0% escape rate.

This 2C/4C machine learning model may be implemented into an adaptive sampling test algorithm, enabling the sampling algorithm to be target-oriented (e.g., able to review each unit on an individual basis). For instance, a unit may be less likely to be selected for testing if the machine learning model predicts that the unit has a low probability of 2C/4C failure, and a unit may be more likely be selected for additional testing if the predicted probability is higher.

In one embodiment, the classification threshold in the ROC curve is adjusted so that the recall is extremely high, which causes more false positive cases, but very few false negative cases. In such embodiments, 2C/4C testing can be skipped for all the units that are predicted to pass, and any units that the model predicts to fail 2C/4C test are submitted for 2C/4C testing. This approach can lead to as much as a 53% savings in total 2C/4C test time. To further reduce the test time, the number of test units can be reduced by applying an adaptive sampling test algorithm that considers the historical failure rate of that particular product, and performs a random sampling with an adaptive rate. The model failure prediction score can also be used to adjust the length of the 2C/4C test time, i.e., by increasing the test duration for devices with a high failure prediction score, and decreasing the test duration for devices with a low failure prediction score.

Figure 4:
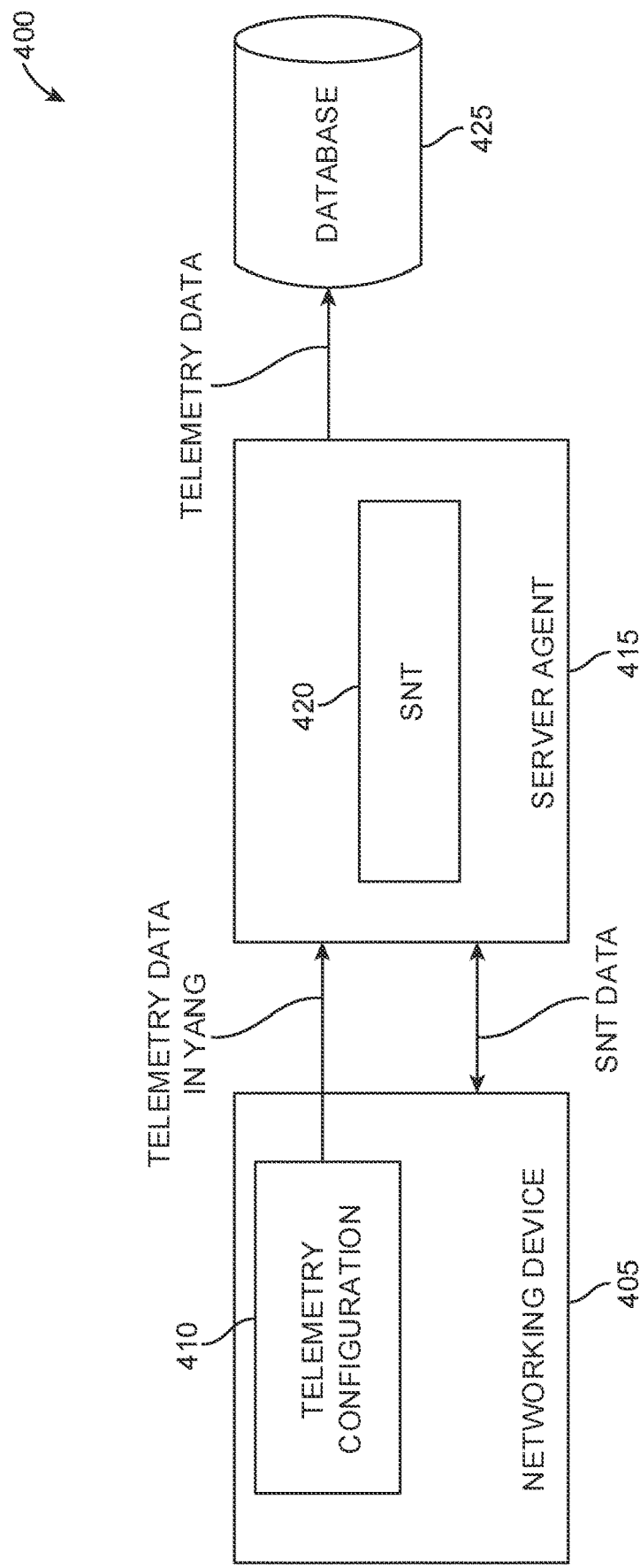
FIG. 4 is a block diagram of a testing platform, according to an example embodiment.

Reference is now made to FIG. 4. FIG. 4 shows a system diagram 400 of the testing platform, according to an example embodiment. A networking device 405 (e.g., a DUT) is shown having a telemetry configuration 410. Networking device 405 outputs telemetry data to a server agent 415 under direction of a System and Traffic (SNT) test 420. The server agent outputs the telemetry data from the networking device to a database 425, where the telemetry data is stored for subsequent analysis. During the testing, SNT data may be exchanged between networking device 405 and server agent 415 according to the instructions provided in SNT test 420. Thus, networking device 405 is evaluated for performance of network operations under a variety of simulated network conditions (e.g., low or high bandwidth conditions, low or high latency conditions, etc.).

Figure 5:
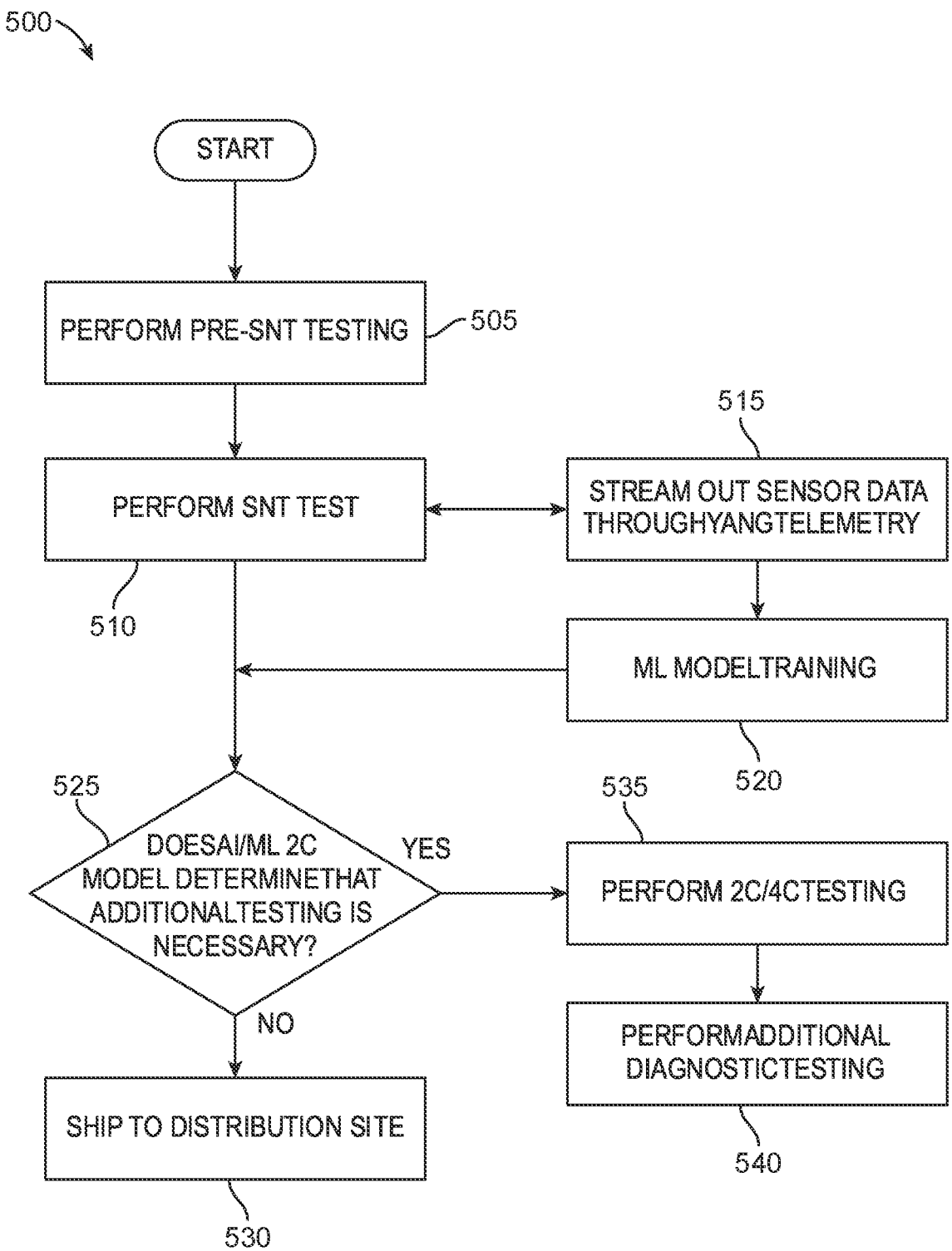
FIG. 5 is a flow chart of an overall testing process, according to an example embodiment.

FIG. 5 illustrates a flow chart that depicts the testing process 500 according to an example embodiment. Initially, pre-SNT testing is performed at operation 505. This testing may include a variety of tests, such as testing the configuration of devices, testing the radio frequency identifier (RFID) functionality of devices, performing P2C testing, and the like.

At operation 510, SNT testing is performed and telemetry data is collected during the SNT test. The sensor data is streamed via YANG telemetry at operation 515 to collect any failure information during the steps before subsequent 2C/4C testing (e.g., P2C testing at operation 505, and/or SNT testing at operation 510). This data may be stored to a database so that a machine learning model can be trained using the actual outcomes of devices under test.

A 2C/4C classifier is trained at operation 520 using machine learning techniques. For example, a machine learning model may be trained on units manufactured during a first span of time (e.g., the month of May) and verified against units manufactured during a second span of time (e.g., the month of June), and similarly, a model may be trained on units manufactured during the second span of time (e.g., the month of June) that can be used to verify units manufactured during a third span of time (e.g., the month of July). Thus, data acquired from previously-manufactured units can be used to verify more recently-manufactured units in a manner that constantly uses the latest available data.

The results of training the machine learning model may be used at operation 525 to determine whether a current device under test requires additional testing. If the device is predicted to pass the additional testing by a predetermined threshold likelihood, the device may be shipped to a distribution site at operation 530. Otherwise, the device may be submitted for 2C/4C testing at operation 535. At operation 540, additional diagnostic testing can be performed to collect data from the devices that were tested that can be used to train additional machine learning models (e.g., at operation 515).

Figure 6:
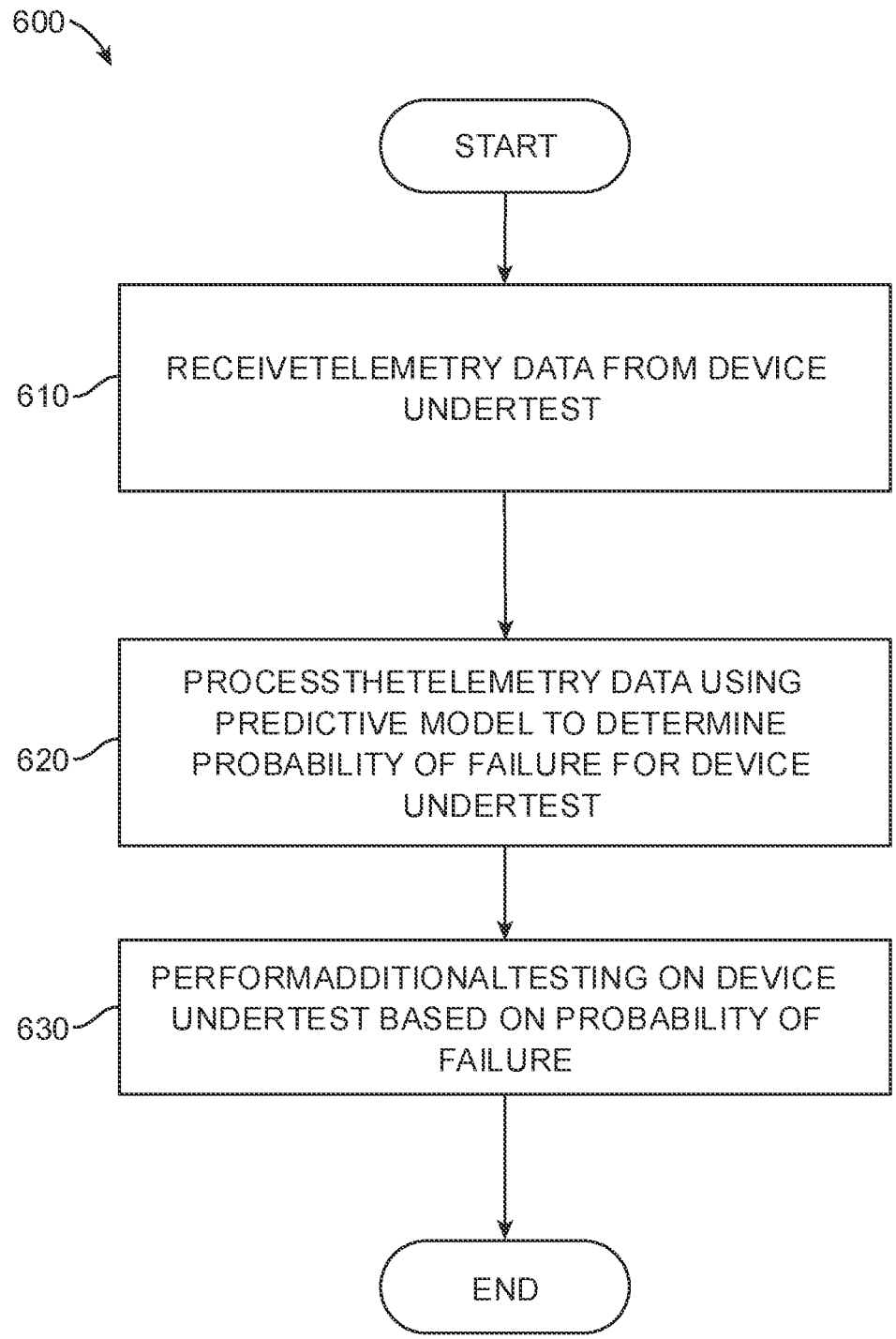
FIG. 6 is a flow chart of a testing process using a machine learning model, according to an example embodiment.

FIG. 6 is a flow chart of a testing process 600 using a machine learning model, according to an example embodiment.

Telemetry data is received from a device under test at operation 610. The telemetry data may be received from a device of a group of devices that are subjected to a testing process, which may involve a test chamber that applies a variety of parameter values to the devices. The parameters that are varied may include internal parameters, such as a temperature parameter, a voltage parameter, a pressure parameter, an electric current parameter, a capacitance parameter, a gyroscopic parameter, a microelectromechanical system parameter, and a stress/strain parameter, and external parameters, such as a traffic rate parameter, a packet drop rate parameter, and an ambient environmental condition parameter.

The testing process may involve any combination of any parameters, as one purpose of testing is to identify any real-world situations in which a device may be susceptible to failure. The telemetry data may be streamed in real-time or near-real time from each device under test, and the testing may include a P2C test, a SNT test, a 2C/4C test, and/or other conventional or other tests.

The telemetry data is processed using a predictive model to determine the probability of failure for the device under test at operation 620. Telemetry data may be processed using a machine learning model that employs conventional or other machine learning techniques to determine a probability of the device passing or failing the current test and/or one or more subsequent tests.

Additional testing is performed on the device under test based on the probability of failure at operation 630. Based on the output value of the predictive model, the device under test may be included or excluded from additional testing, and/or the parameters of the current or subsequent tests may be varied to expose the device under test to more or less rigorous parameter values. In some embodiments, the device under test is selected for additional testing based on the probability of the device passing or failing a particular test satisfying a predetermined threshold value.

Figure 7:
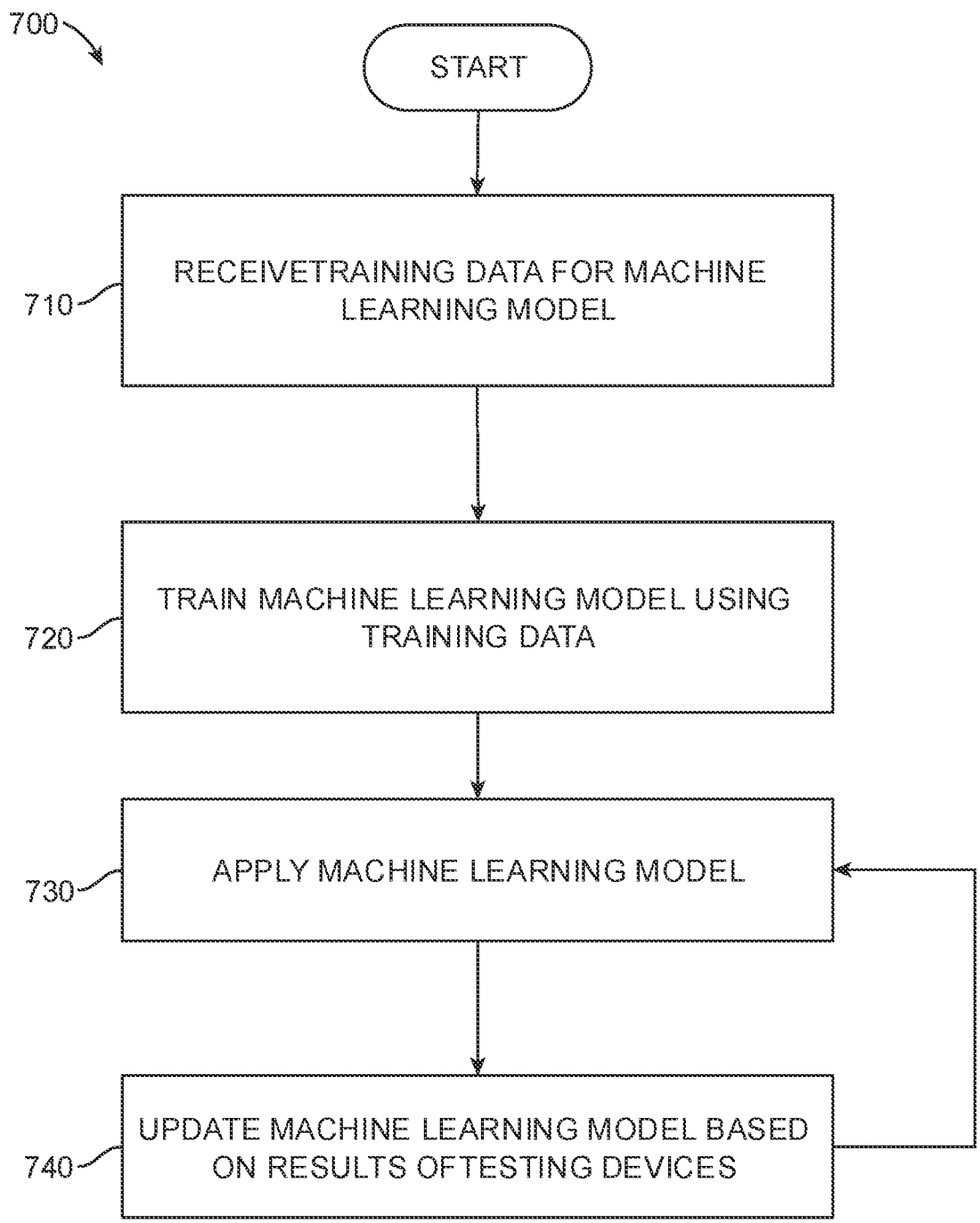
FIG. 7 is a flow chart of a method of training, applying, and updating a machine learning model, according to an example embodiment.

FIG. 7 is a flow chart of a method 700 of training, applying, and updating a machine learning model, according to an example embodiment.

Training data for a machine learning model is received at operation 710. The training data may include telemetry data from network devices that were tested in accordance with present embodiments, each of which may include a time-series set of data that is labeled with respect to whether the associated device, from which the data was obtained, ultimately passed or failed a particular test.

The machine learning model is trained using the training data at operation 720. A predictive model may be trained using the training data; some of the training data may be reserved as testing data to ensure that the machine learning model achieves a desired level of accuracy. A separate machine learning model may be trained for each type or category of device based on a desired level of granularity. For example, a machine learning model may be developed that is specific to a class of devices like routers, switches, etc., or a particular manufacturer of devices, a particular product line of devices, or a specific product.

The machine learning model is applied at operation 730. Telemetry data is received from devices under test, and the telemetry data is provided to the machine learning model to determine a probability that each device passes or fails a particular test. Devices that are predicted to fail a test may be selected to actually undergo the test, during which additional telemetry data may be obtained.

The machine learning model is updated based on the results of testing devices at operation 740. Any devices that underwent the test for which the machine learning model is predictive may be used for additional training by collecting and using as training data the telemetry data collected from those devices during testing. Accordingly, a machine learning model can be iteratively improved using subsequent data to increase the accuracy of the machine learning model over time. Additionally, using machine learning modeling techniques in accordance with present embodiments enables models of devices to be fingerprinted so that baseline behavioral aspects of products can be established prior to shipping to customers.

In one embodiment, a method presented herein includes:
1) A real-time telemetry data platform in a high volume manufacturing environment that is secure, effective for large data collection and instant data processing and no offline processing required.
2) Real-time collections (streaming) of a large amount of hardware-based sensor data and parametric data during the manufacturing process.
3) In-situ product quality risk indexing for each DUT determined by AI/ML algorithm engine so that only small number of high risk DUT will need to perform 2C/4C corner testing.
4) Real-time decision making for each DUT on margin test or no margin test in high volume production test flow while maintain high product quality.

In summary, a model driven telemetry (MDT) methodology is developed for a high-volume manufacturing production testing environment. In this MDT methodology, low-level sensors and parametric data from component and system hardware are streamed in situ at room temperature with machine learning model to decide real-time health (quality) risk index of each DUT. DUT with low quality risk will not need to go through further temperature and voltage marginal testing, i.e. 2C/4C testing. By selecting only high-quality risk DUTs going through margin testing, significant cost and time savings can be achieved while still maintaining high product quality.

The advantages of the in-situ algorithm driven decision making on testing based on low level hardware telemetry data are manifold:
(1) A significant reduction on test equipment and chamber cost through reducing the needs for 2C/4C manufacturing testing on each DUT.
(2) Product testing duration in each test stage can vary based on its in-situ formed parameter distribution. For example, if a given product has very low quality risk, the majority of the DUTs can have their test time reduced due to its well-situated margin distribution.
(3) The overall product quality can be increased by testing longer and harsher on the products more likely to fail. This may not only reduce the potential low-quality products leaking to the customer, but may also avoid the unnecessary scrapping of acceptable products.
(4) The end-to-end first pass yield is improved, thus also result in cost saving. 2C/4C testing introduces operator-induced failures, which can be significant in complex products with complex test set-ups.
(5) The outcome of product distribution model can serve as the time zero model for the products before field operation. This can be coded in-product to check the future degradation in the field in operation.
(6) The debug process is improved for the products that fail testing, as low-level hardware-based sensors data may often pinpoint to the source of the failure.
(7) Techniques disclosed herein may aid in understanding the difference between various components or PCBs from different vendors, enabling vendors of poor-quality products to be avoided Referring to FIG. 8, a block diagram is shown of a computing device 800 that may perform functions associated with testing process discussed herein in connection with FIGS. 1-7.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided comprising: receiving, from a device under test, telemetry data during a current hardware testing phase, processing the telemetry data using a predictive model to determine a probability of failure for the device under test, and performing additional hardware testing on the device under test based on the probability of failure.

In another form, the probability of failure indicates that the device under test has a probability of failing one of: the current hardware testing phase, and a subsequent hardware testing phase.

In another form, the additional hardware testing includes one of: a remainder of the current hardware testing phase, and subsequent hardware testing phase.

In another form, the current hardware testing phase or the subsequent hardware testing phase is selected from a group of: a Pre-2Corner test, a System and Traffic test, and a 2Corner or 4Corner test.

In another form, the predictive model indicates one or more parameters of the additional hardware testing are adjusted based on the predictive model.

In another form, the telemetry data includes one or more internal parameters selected from a group of: a temperature parameter, a voltage parameter, a pressure parameter, an electric current parameter, a capacitance parameter, a gyroscopic parameter, a microelectromechanical system parameter, and a stress/strain parameter.

In another form, the telemetry data includes one or more external parameters selected from a group of: a traffic rate parameter, a packet drop rate parameter, and an ambient environmental condition parameter.

In one form, a computer system is provided, comprising: one or more computer processors; one or more computer readable storage media; program instructions stored on the one or more computer readable storage media for execution by at least one of the one or more computer processors, the program instructions comprising instructions to: receive, from a device under test, telemetry data during a current hardware testing phase, process the telemetry data using a predictive model to determine a probability of failure for the device under test, and perform additional hardware testing on the device under test based on the probability of failure.

In one form, one or more computer readable storage media is provided, the one or more computer readable storage media collectively having program instructions embodied therewith, the program instructions executable by a computer to cause the computer to: receive, from a device under test, telemetry data during a current hardware testing phase, process the telemetry data using a predictive model to determine a probability of failure for the device under test, and perform additional hardware testing on the device under test based on the probability of failure.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
receiving, from a plurality of devices under test, telemetry data during a current hardware testing phase, wherein each device under test is inside of a testing chamber that subjects each device under test to one or more testing conditions based on the current hardware testing phase;
processing the telemetry data using a predictive model to determine a probability of failure for each device under test, wherein the predictive model comprises a machine learning model that is trained using historical telemetry data obtained from one or more previously-tested devices, and wherein the historical telemetry data for each of the one or more previously-tested devices is labeled to indicate whether each previously-tested device passed or failed a specified test during which the historical telemetry data is obtained; and
performing additional hardware testing on a subset of the devices under test based on the probability of failure for each device of the subset of the devices under test exceeding a threshold value, wherein each device having a probability of failure that indicates that the device is predicted to pass the additional hardware testing is excluded from the additional hardware testing.

2. The computer-implemented method of claim 1, wherein the probability of failure indicates that the device under test has a probability of failing one of: the current hardware testing phase, and a subsequent hardware testing phase.

3. The computer-implemented method of claim 1, wherein the additional hardware testing includes one of: a remainder of the current hardware testing phase, and subsequent hardware testing phase.

4. The computer-implemented method of claim 3, wherein the current hardware testing phase or the subsequent hardware testing phase is selected from a group of: a Pre-2Corner test, a System and Traffic test, and a 2Corner or 4Corner test.

5. The computer-implemented method of claim 1, wherein the predictive model indicates one or more parameters of the additional hardware testing that are adjusted based on the predictive model, and wherein adjusting the one or more parameters for the additional hardware testing includes increasing a voltage parameter or a temperature parameter for each device under test.

6. The computer-implemented method of claim 1, wherein the telemetry data includes one or more internal parameters selected from a group of: a temperature parameter, a voltage parameter, a pressure parameter, an electric current parameter, a capacitance parameter, a gyroscopic parameter, a microelectromechanical system parameter, and a stress/strain parameter.

7. The computer-implemented method of claim 1, wherein the telemetry data includes one or more external parameters selected from a group of: a traffic rate parameter, and a packet drop rate parameter.

8. A computer system comprising:
one or more computer processors;
one or more computer readable storage media; and
program instructions stored on the one or more computer readable storage media for execution by at least one of the one or more computer processors, the program instructions comprising instructions to:
receive, from a plurality of devices under test, telemetry data during a current hardware testing phase, wherein each device under test is inside of a testing chamber that subjects each device under test to one or more testing conditions based on the current hardware testing phase;
process the telemetry data using a predictive model to determine a probability of failure for each device under test, wherein the predictive model comprises a machine learning model that is trained using historical telemetry data obtained from one or more previously-tested devices, and wherein the historical telemetry data for each of the one or more previously-tested devices is labeled to indicate whether each previously-tested device passed or failed a specified test during which the historical telemetry data is obtained; and
perform additional hardware testing on a subset of the devices under test based on the probability of failure for each device of the subset of the devices under test exceeding a threshold value, wherein each device having a probability of failure that indicates that the device is predicted to pass the additional hardware testing is excluded from the additional hardware testing.

9. The computer system of claim 8, wherein the probability of failure indicates that the device under test has a probability of failing one of: the current hardware testing phase, and a subsequent hardware testing phase.

10. The computer system of claim 8, wherein the additional hardware testing includes one of: a remainder of the current hardware testing phase, and subsequent hardware testing phase.

11. The computer system of claim 10, wherein the current hardware testing phase or the subsequent hardware testing phase is selected from a group of: a Pre-2Corner test, a System and Traffic test, and a 2Corner or 4Corner test.

12. The computer system of claim 8, wherein the predictive model indicates one or more parameters of the additional hardware testing that are adjusted based on the predictive model, and wherein adjusting the one or more parameters for the additional hardware testing includes increasing a voltage parameter or a temperature parameter for each device under test.

13. The computer system of claim 8, wherein the telemetry data includes one or more internal parameters selected from a group of: a temperature parameter, a voltage parameter, a pressure parameter, an electric current parameter, a capacitance parameter, a gyroscopic parameter, a microelectromechanical system parameter, and a stress/strain parameter.

14. The computer system of claim 8, wherein the telemetry data includes one or more external parameters selected from a group of: a traffic rate parameter, and a packet drop rate parameter.

15. A computer program product comprising one or more non-transitory computer readable storage media collectively having program instructions embodied therewith, the program instructions executable by a computer to cause the computer to:
receive, from a plurality of devices under test, telemetry data during a current hardware testing phase, wherein each device under test is inside of a testing chamber that subjects each device under test to one or more testing conditions based on the current hardware testing phase;
process the telemetry data using a predictive model to determine a probability of failure for each device under test, wherein the predictive model comprises a machine learning model that is trained using historical telemetry data obtained from one or more previously-tested devices, and wherein the historical telemetry data for each of the one or more previously-tested devices is labeled to indicate whether each previously-tested device passed or failed a specified test during which the historical telemetry data is obtained; and
perform additional hardware testing on a subset of the devices under test based on the probability of failure for each device of the subset of the devices under test exceeding a threshold value, wherein each device having a probability of failure that indicates that the device is predicted to pass the additional hardware testing is excluded from the additional hardware testing.

16. The computer program product of claim 15, wherein the probability of failure indicates that the device under test has a probability of failing one of: the current hardware testing phase, and a subsequent hardware testing phase.

17. The computer program product of claim 15, wherein the additional hardware testing includes one of: a remainder of the current hardware testing phase, and subsequent hardware testing phase.

18. The computer program product of claim 15, wherein the predictive model indicates one or more parameters of the additional hardware testing that are adjusted based on the predictive model, and wherein adjusting the one or more parameters for the additional hardware testing includes increasing a voltage parameter or a temperature parameter for each device under test.

19. The computer program product of claim 15, wherein the telemetry data includes one or more internal parameters selected from a group of: a temperature parameter, a voltage parameter, a pressure parameter, an electric current parameter, a capacitance parameter, a gyroscopic parameter, a microelectromechanical system parameter, and a stress/strain parameter.

20. The computer program product of claim 15, wherein the telemetry data includes one or more external parameters selected from a group of: a traffic rate parameter, and a packet drop rate parameter.

* * * * *